2,894,005

PROCESS FOR DEGRADING SIDE-CHAINS OF CHOLIC ACID MATERIALS

Leon J. Rubin, North York Township, Ontario, and Gloria C. Buckley, Toronto, Ontario, Canada No Drawing. Application June 24, 1955
Serial No. 517,907

6 Claims. (Cl. 260—397.1)

This invention relates to the preparation of steroid substances, and more particularly to an improved procedure for degrading the side-chain attached at the 17 carbon position of cholic acid materials.

In the production of steroid hormones from a cholic acid material, it is desirable to remove at least two of the carbon atoms contained in the side-chain attached at the 17 position of the cholic acid molecule. To effect selective degradation of this side-chain, it is required that potentially degradable carbon atoms thereof be blocked so that they do not enter into the degradation reaction. This blocking action may be obtained by introducing, at the 24 carbon position of this side-chain, hydrocarbons such as phenyl radicals. The introduction of these blocking groups into the side-chain of the cholic acid molecule is conventionally obtained by the Grignard reaction. In this reaction, a cholic acid material and an aryl magnesium halide are reacted to produce the aryl derivative of the cholic acid material.

It is an object of this invention to provide an improved method of reacting a Grignard reagent and a cholic acid material in which the aryl derivative of such cholic acid material can be obtained in high yield, reproduceably from batch to batch.

In one aspect of this invention, an aryl derivative of a cholic acid material can be obtained by reaction with an aryl magnesium halide in a medium including tetrahydrofuran. This special reaction medium results in an improved yield of the aryl derivative which, in turn, yields larger amounts of the degraded cholic acid product.

The degradation of the side-chain of a cholic acid material may be produced by a process which involves the steps of (1) reacting an alkanol, such as methyl alcohol, and the cholic acid material to obtain the alkyl ester of the cholic acid material, i.e. an alkyl cholate. This alkyl cholate can be converted to an aryl derivative (2) by the herein disclosed procedure. The aryl derivative may then be purified (3) by crystallization from acetone or some other suitable organic solvent. The purified aryl derivative may then be converted to an ethylene derivative (4) by reaction with acetic anhydride and acetic acid, for example, or by any well known method therefor. This reaction also produces a selective unsaturation of the cholic acid side-chain, resulting in a double bond at the 23–24 carbon position thereof. This ethylene derivative may be reacted with a halogenating agent (5) such as N-bromosuccinimide in a medium including a petroleum hydrocarbon fraction, and then dehydrohalogenated by reaction with such reagents as acetic acid and sodium acetate (6), to produce a double bond in the 20–22 carbon position of the steroid molecule. The dehydrohalogenated cholic acid product, which contains double bonds at the 20–22 and 23–24 carbon positions, may be directly or indirectly oxidized (7) with such reagents as chromic acid, permanganates and peroxides to obtain the degraded cholic acid material. This degraded product can then be converted to steroid hormones by well known processes, or employed directly as a pharmaceutical substance.

The cholic acid material employed in this side-chain degradation process may be any compound having a perhydrocyclopentenophenanthrene ring system with a carboxyl group contained in a side-chain attached at the 17 position, and derivatives of such compounds. As cholic acid materials suitable for side-chain degradation by this process, we mention such bile acids as cholic acid, hyodesoxycholic acid, desoxycholic acid, lithocholic acid, etc. One method of preparing a suitable cholic acid material involves the saponification of animal bile, and simultaneous acid precipitation and extraction of the bile acids contained in such saponified bile, according to the improved procedure of G. C. Buckley and P. Ziegler described in co-pending patent application Serial No. 339,484. In this procedure hyodesoxycholic acid can be separated from a mixture of bile acids.

In the preferred practice of this invention, an alkyl ester derivative of a cholic acid material is reacted with an aryl magnesium halide to produce an aryl derivative of such cholic acid material. Better results are obtained when the alkyl group of this cholic acid ester material contains less than 3 carbon atoms, and especially desirable results are achieved with a methyl cholate material, e.g. methyl hyodesoxycholate.

The Grignard reagent employed in this side-chain degradation process may be any aryl magnesium halide. Better results are obtained with either an aryl magnesium bromide or an aryl magnesium chloride. Economically, the chlorinated Grignard reagents are especially desirable in this process. The hydrocarbon component of this Grignard reagent may be any benzene radical which effects the desired blocking action in the steroid side-chain, and such radicals are well known in the art. Especially desirable results are obtained when this radical is a phenyl group. Although magnesium is to be preferred as the metallic component of this reagent, any metal suitable for producing organometallic compounds may be substituted therefor, and these metals are well known in the art. This Grignard reagent can be prepared by reacting an aryl halide and a magnesium metal, or alloy thereof, in a suitable solvent medium. An improved process for obtaining this Grignard reagent is described in the co-pending application Serial No. 470,520 of Kaiser and Sporar, filed November 22, 1954, wherein an aryl chloride and the magnesium material are reacted in tetrahydrofuran.

The arylation of the cholic acid material can be obtained by reaction with this Grignard reagent in a medium which includes the special tetrahydrofuran solvent of this invention. We have found tetrahydrofuran to be an excellent solvent for the reactants, and it exhibits good solvency for the steroids and metal compounds formed as intermediates during the Grignard reaction. These intermediates tend to precipitate in the solvent media heretofore employed for the Grignard reaction rendering agitation of the reaction mixture most difficult and unduly prolonging the time for completion of the reaction. We have demonstrated that with tetrahydrofuran the Grignard reaction can be obtained in a shorter period of time than was heretofore practicable, resulting in a reproduceably high yield of the aryl derivative of a cholic acid material. Also, the reagents may be suitably recovered from this tetrahydrofuran reaction medium, and both reagents and tetrahydrofuran utilized in subsequent processing. This Grignard reaction may be carried out by refluxing the reaction mixture in suitable equipment for a period of time sufficient to effect completion of the Grignard reaction. After completion of the reaction, the magnesium complex thereupon formed with the cholic acid material can be decomposed, for example, by contacting the reaction mixture with dilute acid solution, which acid can then be separated from the reaction product by washing with water.

When a cholic acid alkyl ester material is employed as a reactant in this Grignard reaction the reaction product is a 24,24 di-aryl carbinol derivative of such cholic acid material.

This invention can be further illustrated by the following specific examples:

*Example I*

The 3,6-dihydroxy-24,24-diphenyl-24-cholanol was obtained by the following method: Magnesium turnings, in the amount of 25 gms., were charged into a three-neck flask equipped with a reflux condenser, stirrer and dropping funnel. The magnesium was just covered with tetrahydrofuran, and a few crystals of iodine introduced into the flask. Then, a mixture of 6 ml. of bromobenzene in 12 ml. of tetrahydrofuran was charged into the flask in a drop-wise manner. Then, 108 ml. of chlorobenzene in 210 ml. of tetrahydrofuran was combined with the reactants in the flask over a period of 35 minutes. The resulting reaction mixture was refluxed for a period of two hours, whereupon a large portion of the magnesium had been reacted and the solution had turned dark brown in color. Thereafter, a solution containing 50 gms. of methyl hyodesoxycholate in 425 ml. of tetrahydrofuran was added to the reaction mixture over a period of one and one-half hours. The resulting mixture was refluxed overnight, and the solution thus formed was poured into a mixture of 1000 ml. of water, 200 ml. of concentrated hydrochloric acid and ice. The reaction product separated to form a supernatant phase in the mixture, and the aqueous subnatant layer was siphoned off. This reaction product was washed several times with water. Then, it was stirred into 200 ml. of acetone, filtered and washed on the filter with acetone. This diphenyl derivative of the hyodesoxycholate was obtained in a yield of 55 gms. and had a melting point of 198.7° C., with softening at 127 to 130° C. This product was recrystallized in benzene by dissolving the diphenyl derivative in 100 ml. of benzene and refluxing the resulting mixture. This mixture was then filtered, and the filtrate chilled to obtain 45.5 gms. of purified product having a melting point of 200 to 202° C.

*Example II*

Magnesium turnings, in the amount of 19.2 gms., were introduced into a 2 liter flask equipped with a mercury-sealed stirrer, reflux condenser, drying tube and dropping funnel. The apparatus was dried by careful heating with a gas flame, and 85 ml. of bromobenzene in 150 ml. tetrahydrofuran was introduced into the flask slowly through the dropping funnel while the magnesium was being stirred. The resulting mixture was heated gently until the reaction had started, and then the heated mixture was refluxed for a period of 2 hours. When the addition of bromobenzene was carried out at a uniform rate, it was found that cooling of the reaction mixture was unnecessary.

Methyl hyodesoxycholate as the benzene complex, in the amount of 25 gms., was dissolved in 175 ml. of tetrahydrofuran, and added quickly to the reaction mixture. A thick precipitate formed in the resulting mixture, but this was dissolved shortly. This mixture was stirred while refluxing overnight.

The reaction mixture was cooled to a temperature of about 5-10° C. To the cooled reaction mixture was added 250 cc. of concentrated hydrochloric acid in 250 cc. of ice-water, and thereafter the flask was shaken vigorously to assure complete decomposition of the metal complexes in the reaction mixture. The greenish precipitate thereupon formed in the reaction mixture was separated from the supernatant liquid by filtration on a Buchner filter. The separated precipitate was washed with toluene and water until it had achieved a white color.

The dry product was obtained in a yield of 26.16 gms., and had a melting point of 194-201° C. (sintered at 115° C). This product could be further purified by recrystallization from acetone.

The separated supernatant liquid from the previous step was extracted once with toluene. The resulting extract was pooled with the aforementioned toluene washings, and the resulting pool was distilled to a brownish gum. This gum was triturated with 35 ml. of acetone, whereupon a precipitate formed in the mixture. This mixture was cooled, and the precipitate separated from the supernatant liquid by filtration. The separated precipitate was dried to yield 3.26 gms. as a white solid product. This product melted at a temperature of 133-135° C., and solidified and remelted at 204° C.

Therefore, in consideration of solvent held as a complex in the product, the total yield of carbinol derivative was 27.0 gms., which represented a 92% yield on the basis of the starting material.

*Example III*

Magnesium turnings, in the amount of 11.2 gms., were charged into a one liter, 3-necked flask equipped with a condenser, stirrer and dropping funnel and protected against the intrusion of moisture. To the magnesium was added, drop-wise, a solution of 3 ml. of bromobenzene in 6.9 ml. of tetrahydrofuran with stirring and gentle heating. The appearance of a blue color in the reaction mixture indicated the commencement of the reaction. To this reaction mixture was added, drop-wise, a solution of 53.6 ml. of chlorobenzene in 106 ml. of tetrahydrofuran over a period of 20 minutes, while such mixture was being stirred and refluxed. The stirring and refluxing of the reaction mixture was continued for a period of 3 hours.

To the refluxed reaction mixture was added, drop-wise, a solution of 20 gms. of methyl cholate in 171 ml. of tetrahydrofuran over a period of approximately 15 minutes, while the mixture was being continuously stirred. The rate of addition of this reactant was such as to produce a fairly vigorous refluxing of the reaction mixture. The stirring and refluxing of this mixture was continued for a period of 18 hours, and such mixture remained liquid at all times. The refluxed reaction mixture was cooled, and poured into a mixture of ice and water which contained 44 ml. of sulfuric acid in 210 ml. of water, while being continuously stirred. The aqueous layer thereupon formed in the mixture was separated and washed with ether. The resulting ether extract was combined with the separated supernatant layer of the reaction mixture. The resulting solution was washed twice with water and dried over sodium sulfate.

This partially dried product was evaporated to dryness in vacuo, and obtained in a yield of 28.8 gms. This dried product was dissolved in 265 ml. of ethanol and treated with charcoal to remove color. The decolorized solution was mixed with 215 ml. of water, and upon cooling very slowly the product was obtained as crystals.

These crystals were separated from the mother liquor by filtration, washed with aqueous ethanol and dried in vacuo. The yield of dry product was 15.8 gms. having a melting point of 172.5-173.5° C.; $(\alpha)_D^{24} = +25.6°$.

The separated mother liquor was concentrated to dryness in vacuo, and recrystallized from 93 ml. of ethanol and 70 ml. of water according to the aforementioned crystallization procedure. The yield of dried product was 6.8 gms. having a melting point of 170-172° C.; $(\alpha)_D^{24} = +25.0°$.

The total yield of dry product was calculated as 88%.

*Example IV*

Methyl desoxycholate, in the amount of 20 gms., was reacted with magnesium chlorobenzene according to the method of Example III. The crude dry reaction product was obtained in a yield of 31.8 gms. This dry product was dissolved in 280 ml. of methanol, treated with charcoal to obtain a clarified solution, and crystallized by the addition of 78 ml. of warm water and slowly cooling the crystallization mixture over night. The yield of dry purified product was 22.9 gms. having a melting point of 111–113° C.; $(\alpha)_D^{24} = +38.6°$. This represented a total yield of 88%.

*Example V*

A 50 gal. reactor, equipped with stirrer and condenser, was carefully dried and charged with 6.75 lbs. of magnesium turnings and 10 gal. of tetrahydrofuran. A starter reaction mixture, prepared separately by mixing and warming some magnesium turnings with 0.4 gal. of tetrahydrofuran and 0.4 gal. of bromobenzene, was added to the still and the contents heated in order to maintain the reaction. Then, over a period of 1½ hours, 35.5 lbs. of chlorobenzene in 56.5 lbs. of tetrahydrofuran were gradually introduced, the mixture being continuously stirred and heated. After addition of the chlorobenzene had been completed, heating was stopped but the reaction was allowed to proceed for an additional 3 hours, its exothermal nature providing an adequate reflux rate. Titration of the mixture then showed that all of the magnesium had reacted to form the desired Grignard reagent.

Methyl hyodesoxycholate-benzene complex, corresponding in amount to 12 lbs. of pure ester, was dissolved in 60 lbs. of tetrahydrofuran, and the resulting solution was charged into the still. This addition required 45 minutes. Refluxing overnight with agitation completed the reaction, the mixture becoming viscous at first, but upon further heating it became much more fluid.

The next morning the reaction mixture, while still hot, was pumped into a vigorously stirred mixture composed of 69 lbs. of water, 48 lbs. of concentrated sulphuric acid and 250 lbs. of crushed ice. The Grignard reaction product floated to the surface and the aqueous phase was drawn off. This product was washed successively with water, sodium bicarbonate solution and again with water. It was dissolved by heating with 10 gals. of methyl ethyl ketone and 1 gal. of water, and upon cooling crystallization took place. The solids were filtered off, washed with a small amount of methyl ethyl ketone, and dried in a vacuum at 60° C. There was obtained 15.25 lbs. of 3,6-dihydroxynor-cholanyldiphenyl carbinol as the methyl ethyl ketone complex, having a double melting point; the complex melts at 130° C., resolidifies at 138–140° C. and finally remelts at 208–210° C.

While in the foregoing specification, various embodiments of this invention have been set forth and specified details thereof elaborated for the purpose of illustration, it will be apparent to those skilled in the art that this invention is susceptible to other embodiments and that many of these details may be varied widely without departing from the basic concept and spirit of the invention.

We claim:

1. In the preparation of steroid substances, the step of contacting an ester having the formula

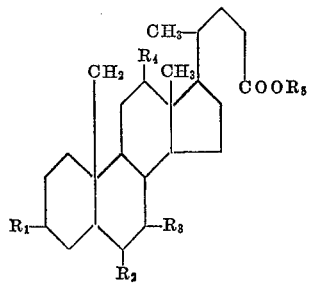

wherein the substituents, $R_1$, $R_2$, $R_3$ and $R_4$ are each selected from the group consisting of a hydroxyl radical and a hydrogen atom and wherein $R_5$ is selected from the alkyl radicals of the lower monohydric alcohols, with an aryl Grignard reagent selected from the group consisting of phenyl magnesium chloride and phenyl magnesium bromide in a solvent medium consisting of tetrahydrofuran.

2. In the preparation of steroid substances, the step of contacting an ester having the formula

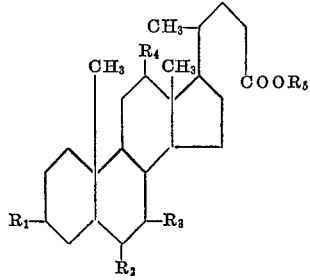

wherein the substituents $R_1$, $R_2$, $R_3$ and $R_4$ are each selected from the group consisting of a hydroxyl radical and a hydrogen atom and wherein $R_5$ is selected from the group consisting of methyl and ethyl radicals, with an aryl Grignard reagent selected from the group consisting of phenyl magnesium chloride and phenyl magnesium bromide in a solvent medium consisting of tetrahydrofuran.

3. In a process of the character described, the step of contacting an ester having the formula

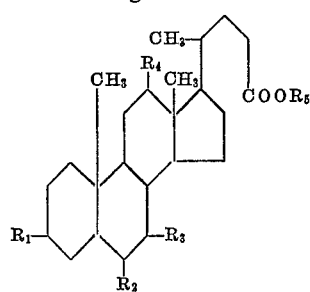

wherein the substituents $R_1$, $R_2$, $R_3$ and $R_4$ are each selected from the group consisting of a hydroxyl radical and a hydrogen atom and wherein $R_5$ is selected from the group consisting of methyl and ethyl radicals, with phenyl magnesium chloride in a solvent medium consisting of tetrahydrofuran.

4. The process of preparing a tertiary carbinol derivative of methyl hyodesoxycholate which comprises the steps of contacting methyl hyodesoxycholate with phenyl magnesium chloride in a solvent medium consisting of tetrahydrofuran.

5. The process of preparing a tertiary carbinol derivative of methyl cholate which comprises the steps of contacting methyl cholate with phenyl magnesium chloride in a solvent medium consisting of tetrahydrofuran.

6. The process of preparing a tertiary carbinol derivative of methyl desoxycholate which comprises the steps of contacting methyl desoxycholate with phenyl magnesium chloride in a solvent medium consisting of tetrahydrofuran.

References Cited in the file of this patent

UNITED STATES PATENTS

| | | |
|---|---|---|
| 2,304,100 | Julian | Dec. 8, 1942 |
| 2,461,911 | Miescher | Feb. 15, 1949 |

OTHER REFERENCES

Fieser and Fieser: "1950," "Organic Chemistry," page 135.

Kharasch et al.: Grignard Reactions of Nonmetallic Substances, pages 51–52, 1954, New York.